July 3, 1956 F. J. HOOVEN 2,753,190
REAR AXLE SYSTEM FOR PASSENGER CARS
Filed April 25, 1952 4 Sheets-Sheet 1

INVENTOR
FREDERICK J. HOOVEN
BY *Marechel Biebel French & Bugg*
ATTORNEYS

July 3, 1956
F. J. HOOVEN
2,753,190
REAR AXLE SYSTEM FOR PASSENGER CARS
Filed April 25, 1952
4 Sheets-Sheet 2
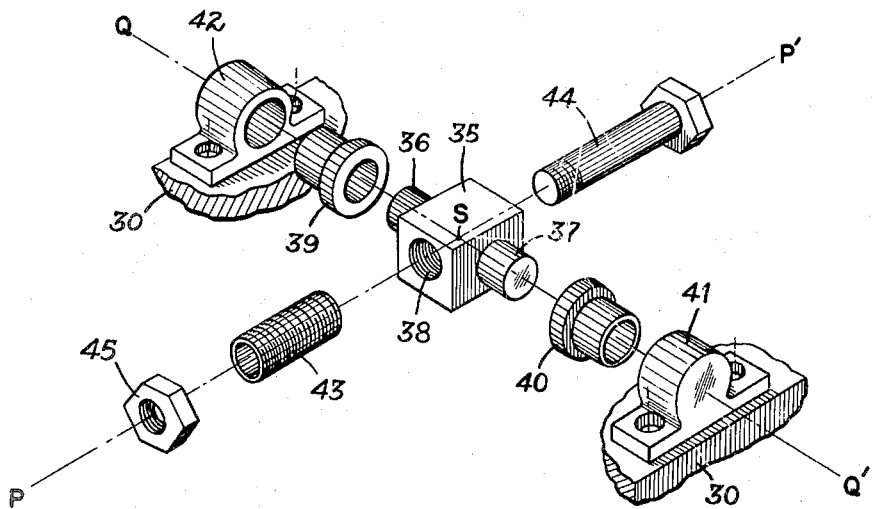
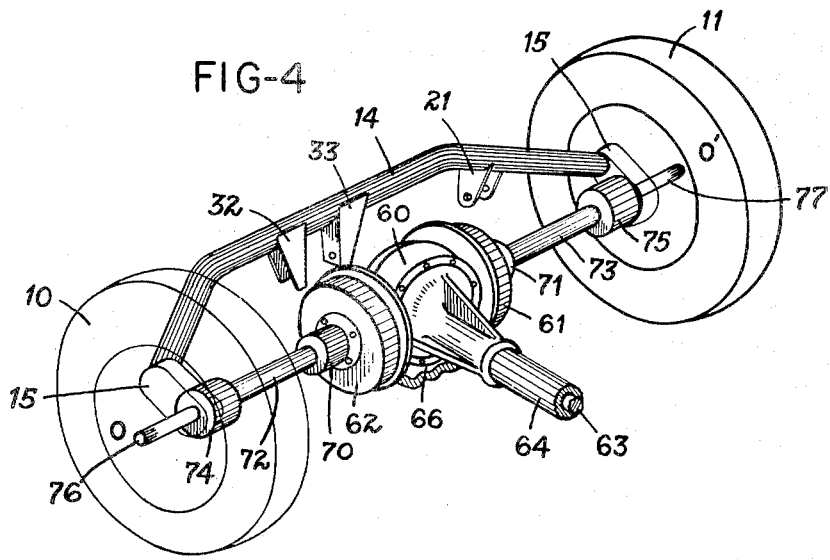
INVENTOR
FREDERICK J. HOOVEN
BY *Mareschal Biebel French Bugg*
ATTORNEYS FIG-5a
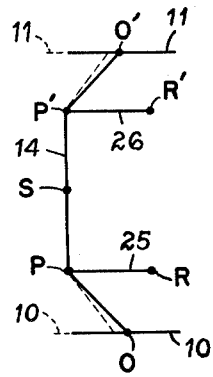
FIG-5d
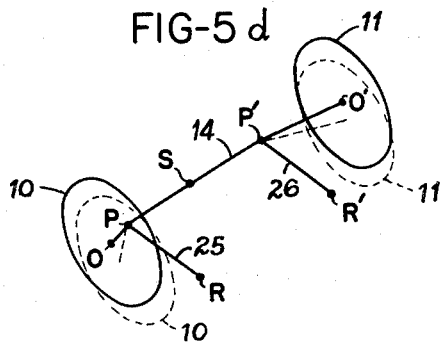
FIG-5b
FIG-5c
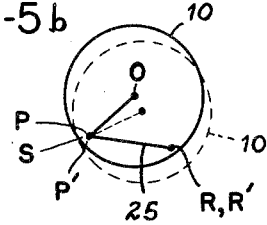
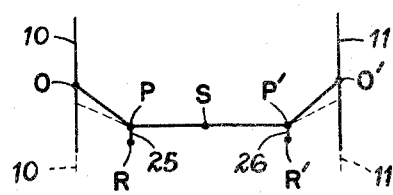
FIG-6a
FIG-6d
FIG-6b
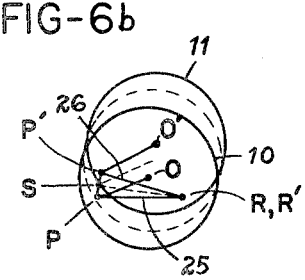
FIG-6c
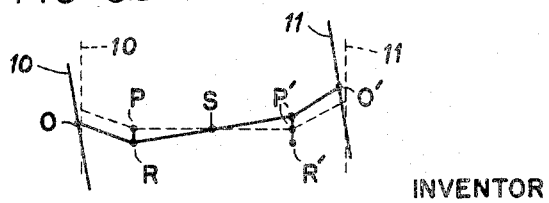
INVENTOR
FREDERICK J. HOOVEN
BY Marechal Biebel Franck Bugg
ATTORNEYS July 3, 1956 F. J. HOOVEN 2,753,190
REAR AXLE SYSTEM FOR PASSENGER CARS
Filed April 25, 1952 4 Sheets-Sheet 4
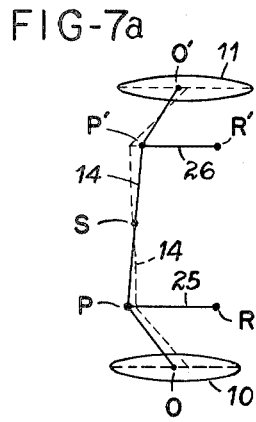
FIG-7a
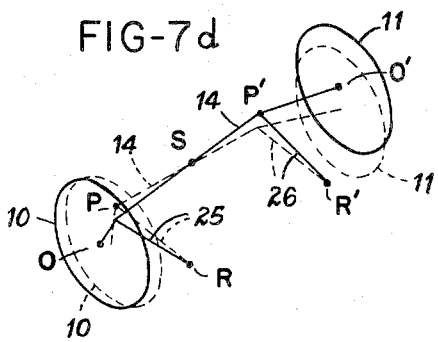
FIG-7d
FIG-7b
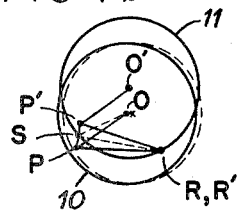
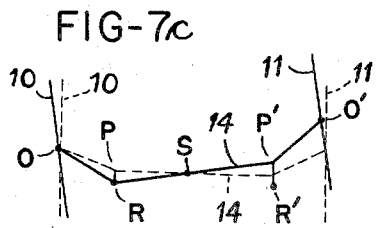
FIG-7c
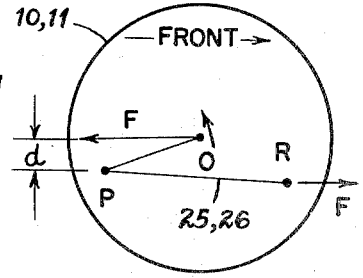
FIG-8
FIG-9
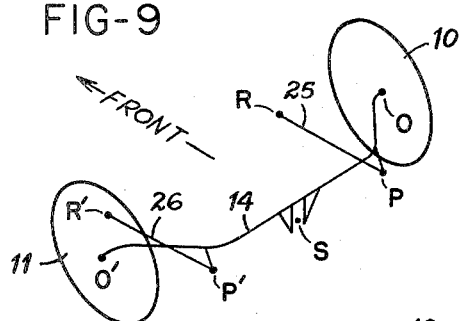
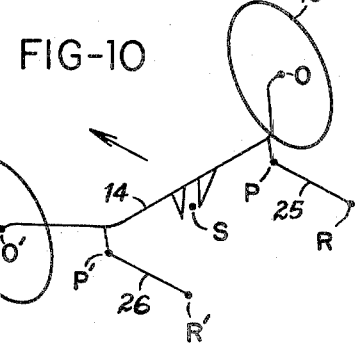
FIG-10
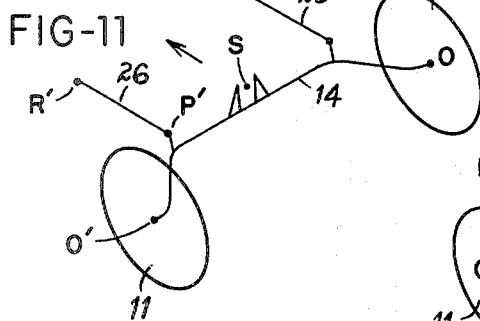
FIG-11
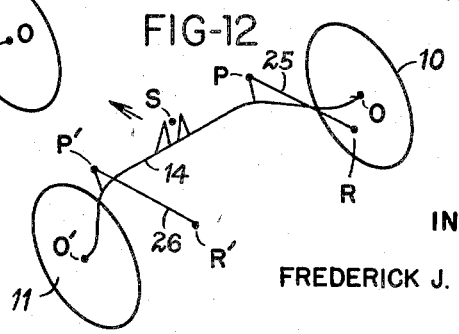
FIG-12
INVENTOR
FREDERICK J. HOOVEN
BY *Marechal Biebel French & Bugg*
ATTORNEYS United States Patent Office 2,753,190
Patented July 3, 1956

2,753,190

REAR AXLE SYSTEM FOR PASSENGER CARS

Frederick J. Hooven, Dayton, Ohio, assignor to Ford Motor Company, Dearborn, Mich., a corporation of Delaware Application April 25, 1952, Serial No. 284,412

8 Claims. (Cl. 280—112)

The rear axle of a conventional rear drive car must be mounted on the frame of the car with enough flexibility to allow vertical movement relative to the frame and body essential to comfortable riding. At the same time it must be sufficiently restrained in other degrees of freedom to resist the horizontal forces along the axis of the car, the torque reaction due to driving and braking action and the lateral forces due to centrifugal force in cornering. Likewise its angular position in the horizontal plane must be accurately maintained under all conditions in order to avoid dangerous aberrations in the steering behavior at high speeds, since a steering angle of as little as 1° is sufficient to cause a turn sharp enough to bring a car to the verge of uncontrollability at 75 M. P. H.

The conventional rear axle consists of a solid structure between the wheels, carrying the brakes at its ends and the final bevel gear drive and differential at its midpoint. The weight of this unit, with the wheels, usually will average about 10 per cent of the weight of the vehicle, and more than 20 per cent of the weight carried on the rear wheels. It is generally agreed that this large unsprung mass is detrimental to the comfort and stability of the car on rough roads or at high speeds, since it tends to oscillate at such amplitudes as to cause the wheels to leave the ground momentarily, at which time they are useless for keeping the car on its course. Such a mass, flexibly mounted and subject to various combinations of forces and couples, will have a number of modes of resonant vibration both in translation and rotation which have a particularly violent effect on the car's behavior. The concentrated mass of the gear drive and differential unit at the center of the axle aggravates these oscillations because of its tendency to become a center of rotation when subjected to unbalanced forces, serving thus as an anvil whereby disturbances in the position of one wheel are caused to produce a disturbance of the other wheel, thereby inducing or exciting various modes of vibration.

On the other hand, the large unsprung mass serves to improve the softness of riding at low speeds or on smoother roads (the "boulevard ride") because it forces the tires to absorb the smaller irregularities of the road without communicating so much motion to the axle. This type of ride is of great importance in the saleability of a car, and cannot be materially sacrificed in order to improve comfort and safety under more severe conditions.

Various systems have been built in which the differential unit is mounted on the frame of the car instead of on the axle, thus removing its mass from the unsprung mass and adding it to the sprung mass. In some of such systems the wheels are independently suspended, and in others they are mounted on a dead axle, the latter being known as the DeDion system. In either case the drive connections to the wheels are made by jointed shafts which permit the requisite movement of the wheels relative to the differential. Such systems have not been much used, however, partly because of cost but also because of various difficulties which are encountered. Any independent rear system, lacking an axle to maintain the wheels in constant relation to one another, tends to be handicapped by steering difficulties, and such difficulties increase as the flexibility of the springs is increased, since the possible wheel movements become greater, and the range of variation in their position with changes in load is likewise increased. The DeDion system is often used on sports and road-racing cars in which stability and control are paramount, but has not found favor in designs where riding comfort is a major factor. In many designs of this system the dead axle actually moves through a greater amplitude than the wheels themselves, thus increasing its effective unsprung weight, and this weight is almost always some distance removed from the wheel axis, the axle being bent to clear the differential and drive shafts. This effect gives rise to an unbalanced couple on vertical accelerations of the unsprung mass, giving the effect of roughness. However, as cars continue to increase in speed and power the shortcomings of the conventional axle become more critical and the need for an improved system more evident.

When a car is cornering, the centrifugal force causes the body of the car to lean toward the outside of the curve, with the result that the springs toward the outside of the curve are compressed, with the body nearer the wheels than normal, while those on the inside of the curve are extended, the body being farther above the wheels than normal. This condition, where the deflections of the springs are equal and opposite, is referred to as a roll deflection, as distinct from a parallel deflection when both springs are compressed or extended equally. If spring deflection is accompanied by any fore-and-aft displacement of the suspended point relative to the car frame, it is evident that a roll deflection will be accompanied by a steering motion of the rear axle. If upward motion is accompanied by a rearward motion, it will be seen that a roll deflection will cause a steering action such as to augment the turn that originally caused the roll. This condition is an obviously unstable and dangerous one, and it is generally known as oversteer. Stability requires that such a condition be absent, and in order to counteract other causes of the same type of instability it is common to introduce a degree of the opposite condition, known as understeer, in which the axle moves forward as it moves upward. Such a condition is incompatible with the highest degree of comfort and smoothness, as it may be seen that when a wheel strikes an obstruction the point of impact will be forward of the wheel center, and there will be a rearward component of the resulting upward force, so that a rearward motion of the wheel under such condition would help absorb the shock. This rearward force is augmented by the fact that when a tire is compressed on striking a bump, the effective rolling radius of the wheel is reduced, and its speed of rotation tends to increase, thus accelerating its center rearward. However the effects of oversteer are so catastrophic that no compromise is made with it to gain additional comfort.

The present invention provides an axle system which overcomes some of the above enumerated difficulties. The term "axle" is used herein in the sense of a dead axle, not necessarily occupying the wheel axis, on which wheels are mounted with their axes in fixed relationship to one another, as distinct from a live axle which rotates with the wheel. The term "axle system" refers to an axle with wheels as adapted to be used as a functioning part of a vehicle, taken together with the various elements by means of which the axle is movably related to the frame of the vehicle, and by means of which its possible modes of motion relative to the vehicle frame are defined.

It is an object of the present invention to provide an axle system of kinematical design, by which is meant that the positions and degrees of freedom of the structure are uniquely defined by its elements without multiple constraint, redundant members or indeterminate forces.

Another object is to provide an axle system in which the effective unsprung mass of the axle is less than the mass of the axle.

A further object is to provide an axle system which has a rearward component of upward wheel motion, while permitting rear axle understeer in roll deflection.

Another and further object is to provide an axle system in which the deflections induced by braking and driving forces tend to neutralize the changes of vehicle attitude otherwise induced by these forces.

A still further object is to provide an axle system in which parallel deflections are accomplished by rotation of the axle about an axis which is fixed relative to the axle, while roll deflections are accomplished by rotation of the axle about an axis which is fixed relative to the vehicle.

In the drawings—

Fig. 3 is an exploded view in perspective of the various parts of the center bearing;

Fig. 4 illustrates the relation of suitable driving and braking parts to the remaining parts of the system;

Figs. 5, 6 and 7 are diagrammatic representations and are divided into separate views identified as 5a, 6a, etc. showing a plan view, 5b, 6b, etc. showing a side elevation, 5c, 6c, etc. showing an end elevation, and 5d, 6d, etc. showing a perspective representation of the various deflected states of the system;

Fig. 8 is a force-moment diagram illustrating the deflection component of a braking force; and Figs. 9 through 12 are simplified diagrammatic views showing different possible combinations of relative positions of the deflection axis, the wheel axis, and the location of the radius arms.

Figure 1:
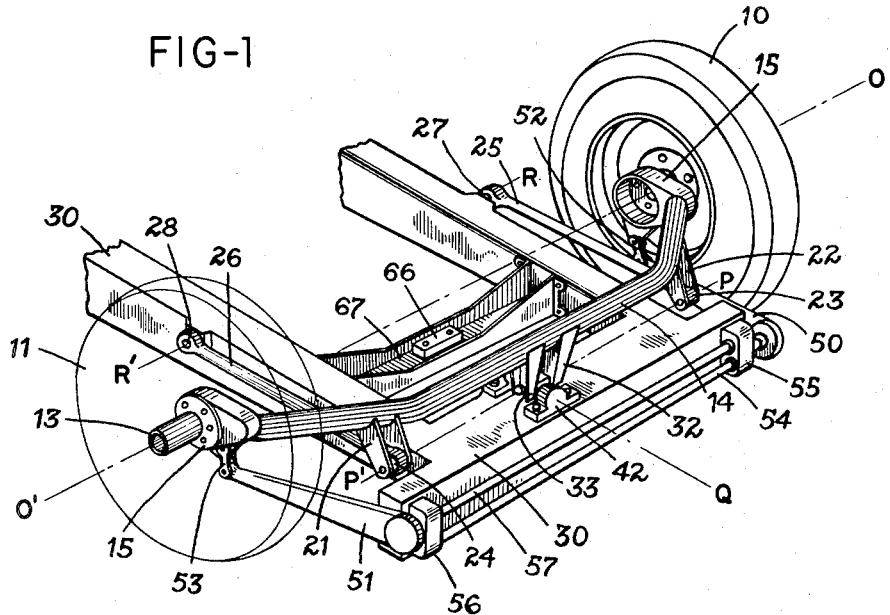
Fig. 1 is a general view of the axle system, which has been shown with the driving and braking mechanism omitted for clarity of representation, as seen from a point to the left and to the rear of the vehicle.
Figure 2:
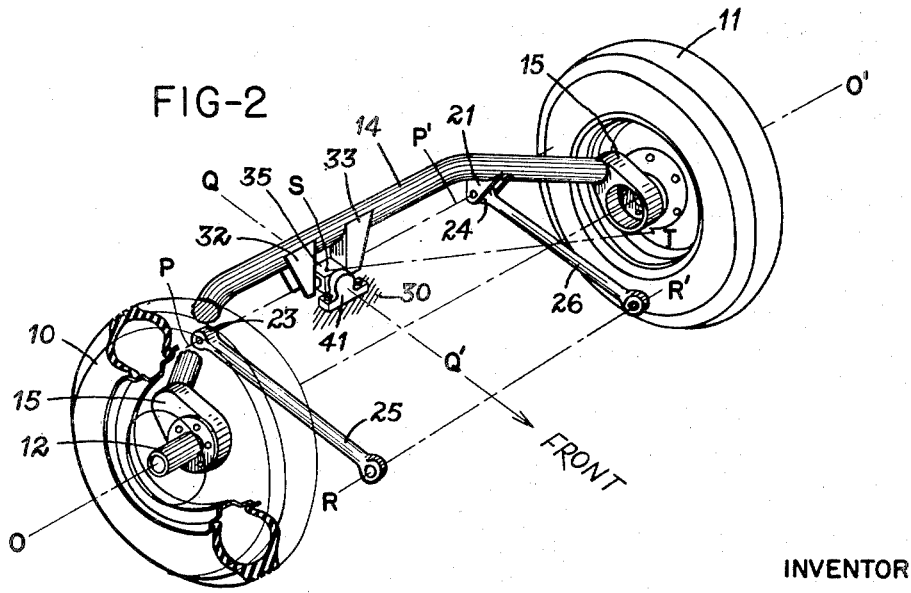
Fig. 2 shows the elements of the kinematical design of the system, viewed from the opposite direction to Fig. 1.

Referring to the drawings which illustrate a preferred embodiment of the invention, in Figs. 1 and 2 there are shown the two wheels 10 and 11, having the common axis O—O', referred to as the wheel axis. It may be remarked that for certain specialized purposes it may be desired that the respective axes of the wheels be slightly inclined to one another, but for general purposes and for purposes of description they are to be regarded as coaxial. The wheels 10 and 11 are mounted by the usual bearings on the hollow spindles 12 and 13, carried on axle 14, which is shown as a bent tube having appropriate connecting structure 15 at its ends for carrying the spindles. Fixed to axle 14 at opposite sides thereof are brackets 21 and 22 which carry and support bearings 23 and 24 along the axis P—P', referred to as the deflection axis. Radius arms 25 and 26 are pivotally attached to the bearings and extend forwardly along a line that is horizontal or slightly downward sloping away from the axle to points of attachment 27 and 28 on the line R—R' where they are pivotally attached to the vehicle frame 30, which is regarded as fixed. The bearings at the forward ends of the arms 25 and 26 may be ball joints or rubber bushings which offer freedom of rotation about all axes, thus insuring that the forces impressed on these arms may always be coaxial with the line between the pivots. The deflection axis P—P' is parallel to the wheel axis O—O', and normally a distance behind (for example 10") and a distance below (for example 4") the wheel axis. Midway between the brackets 21 and 22 along the axis P—P' is the fixed point S which is restrained against lateral and vertical movement and also fixed relative to the axle 14 by means of the structure shown in detail in Fig. 3. This structure is attached to the axle by means of brackets 32 and 33 which are fixed to the axle 14.

Referring to Fig. 3, the point S is shown as contained within the bearing block 35, where it marks the intersection of the axes of the pins 36 and 37 and of the threaded bearing 38, which are perpendicular to one another in a plane substantially parallel to the normal positions of arms 25 and 26. Pins 36 and 37 fit within the rubber bushings 39 and 40, which in turn are held in fixed bearing blocks 41 and 42, forming the axis Q—Q' which is fixed relative to the vehicle frame 30. Threaded bushing 43 is tightly held between brackets 32 and 33 by means of bolt 44 and nut 45, and cooperates with the threaded bearing hole 38 contained in block 35. The bushing is thus maintained coaxial with the axis P—P' which is fixed relative to the axle 14.

Referring again to Figs. 1 and 2, the axis R—R' is horizontal and may be in the same horizontal plane as the point S if no understeering deflection in roll is desired, or may be below this plane to the extent that roll understeer is desired, as will be apparent from subsequent discussion. Hence in the example shown, understeering is incorporated, and the axis R—R' is lower than the point S. The blocks 41 and 42 are attached to the frame of the car in such a manner that the axis Q—Q' thereof is maintained within the plane R—S—R', and the bushings 39 and 40 are provided with some axial clearance which permits a slight movement of the point S along the axis Q—Q' which is referred to as the roll axis.

The normal position of the deflection axis P—P' being horizontal, it will be seen that the normal position of the points P and P' and of the axes P—R and P'—R' of the arms 25 and 26 will be in the plane R—S—R'. Since the midpoint S of the axis P—P' is fixed to the roll axis Q—Q' it will be seen that in any possible state of deflection a vertical displacement of the point P from the fixed plane R—S—R' must be accompanied by an equal and opposite displacement of the point P', and that likewise the arms 25 and 26 will be constrained to form equal and opposite angles to the plane R—S—R'.

The weight of the vehicle is transferred from the frame to the axle by means of the arms 50 and 51 (Fig. 1), attached to axle 14 by ball-jointed links 52 and 53. Torsion bar 54 is attached to arm 50, and the adjacent part of it is pivotally supported in block 55, fixed to frame 30, providing an axis about which arm 50 may rotate. The opposite end of bar 54 is fixed to block 56. Bar 57 has a similar relation to arm 51 and blocks 56 and 55. By their twisting motion the bars 54 and 57 allow a compliant motion of arms 50 and 51 about their respective axes of rotation, thus permitting vertical compliant motion of the axle system and wheels. Damping means, such as hydraulic or friction devices commonly used are not shown in order to avoid complication of representation, the use and application of such means being well known to those skilled in the art.

The normal position of the axle system is defined as that which obtains when the system is static, and the normal vehicle weight is being supported. The provision of the ball-jointed links 52 and 53 assures that no restraint can then be imposed on the motion of the system by the arms 50 and 51 other than in the directions in which freedom is permitted by the other elements of the system. Other types of spring suspension can be used with the present system to obtain the same results only if they exert on it a similarly limited and defined restraint.

Fig. 4 shows a suitable arrangement of driving and braking parts as related to the present system, of which the wheels 10 and 11 and the axle 14 are shown in similar aspect to that of Fig. 2. At 60 there is indicated a differential housing of conventional and familiar appearance, which has drive-shafts not shown whose axis is parallel to the lateral axis of the vehicle. Carried on these drive shafts are the brake drums 61 and 62, within which are brakes of conventional construction whose stationary parts are mounted on the differential housing 60. There is also shown propeller shaft 63 carried within torque tube 64, and connected in the usual way to the engine and transmission of the car. These elements and their relationships are all familiar and well understood by those skilled in the art.

These parts are related to the axle 14 in such a way that the axis of the differential drive shafts is on or near the normal position of wheel axis O—O'. This relationship is maintained, and the differential unit is held in fixed relation to the frame of the vehicle by means of mounting block 66 which is fixed to the differential housing 60, as shown in Fig. 4 and which is also fixed to frame cross-member 67, attached to frame 30, as shown in Fig. 1. Carried on the drive shafts of the differential are the universal joints 70 and 71, to which are attached jointed shafts 72 and 73. These are in turn attached to universal joints 74 and 75, which are attached to splined axle shafts 76 and 77. The shafts 76 and 77 rotate within the hollow spindles 12 and 13 and are fixed to wheels 10 and 11 by means not shown but which are familiar to those skilled in the art, being similar in all respects to the means by which the axle shafts are fixed to the wheels in the type of axle generally known as "full floating."

As shown, the differential housing remains fixed to the vehicle frame, although the mounting 66 may be a rubber block allowing a small relative movement in order to reduce the transmission of gear noise to the frame. Relative movement of the wheels is permitted by the universal joints, these being of the type which does not impose axial restraint on the connected shaft, or alternatively they may be supplied with a splined joint to allow axial extension of the shafts 72 and 73, so that no restraint of relative wheel movement other than in rotation about the wheel axis is imposed by the drive system. Such jointed shaft systems are commonly used in propeller shaft applications in standard vehicle construction, and the components and arrangements are familiar to those skilled in the art.

Referring again to Figs. 1 and 2, it will be seen that the axle 14 is free to rotate about the axis P—P', and as it does so the axis O—O' moves vertically, remaining horizontal, which constitutes parallel deflection. The axis P—P' being behind and below the normal position of the axis O—O', it will be seen that upward vertical deflection of O—O' will be accompanied by a rearward movement, by means of which one of the objectives of the present invention is achieved. Such upward deflection is shown in Figs. 5a to 5d where the system is indicated diagrammatically in three direct projections and in orthogonal projection similar to that of Fig. 2. The axle is represented by the bent line O—P—S—P'—O' which connects the points named without attempting to represent the actual structure of axle 14. The points R and R' are shown an exaggerated distance below the point S in order to accentuate the degree of understeer as will be apparent from Figs. 6a to 6d and 7a to 7d. The normal position of the system is shown in dashed lines, the deflected position being shown in solid lines.

In Figs. 5a to 5d is shown the condition of parallel deflection, with the wheels moving upwardly and rearwardly from their normal position, and the axis P—P' and the arms 25 and 26 remaining fixed.

In Figs. 6a to 6d is shown the condition of roll deflection, with wheel 11 moved upwardly and wheel 10 moved an equal amount downwardly. Here it may be seen that point P' moves upward, and P moves downward an equal amount, thus causing the arms 25 and 26 to assume equal and opposite angles to their normal positions, as explained hereinbefore. Due to the initial inclination being in the direction of its further travel arm 26 assumes a greater inclination to the horizontal than arm 25, thus causing point P' to assume a position forward of point P. This causes a corresponding forward position of wheel 11 with respect to wheel 10, which is an understeering condition, thus realizing another of the objectives of the present invention. Here it may also be noted that the distance SR as seen in the side elevation is the altitude of the equilateral triangle P—P'—R, and as such is necessarily slightly less than the distance P—R, so that under conditions of roll deflection the point S will move forward a small amount from its normal position.

Figs. 7a to 7d show the condition where the parallel and roll deflections are superimposed, giving an upward movement of wheel 11 with no vertical deflection of wheel 10. It being recalled that parallel deflection is a rotation of the system about the axis P—P', and roll deflection is a rotation about the axis Q—Q' (Fig. 1) it will be seen that the resultant of these two rotations of such degree as to maintain wheel 10 without vertical movement will be a rotation about the axis S—T, where T is a point along the intersection of the plane of the wheel 11 and the plane R—S—R', directly beneath the wheel axis O—O', as shown in Fig. 2.

Returning to Figs. 7a to 7d it will be seen that the points P, P', R, R' and S maintain an attitude unchanged from that in pure roll deflection as seen in Figs. 6a to 6d, while the superimposed parallel deflection takes place about the rotated axis P—P' and causes equal rearward movements of both wheels, and thus maintains unchanged the steering angle of the system as shown in Figs. 6a to 6d. Wheel 10 is thereby moved rearwardly by the combined amounts of the two deflections, while wheel 11 assumes a position equal to the difference between the forward motion due to roll and the rearward motion due to parallel deflection. Since the rearward motion is greater than the forward, the wheel 11 assumes a lesser rearward motion from its normal position. Since the understeer in Figs. 5, 6 and 7, a to d inclusive, has been exaggerated for better representation, in an actual design the forward movement of the wheel in roll is relatively small compared with its rearward movement in parallel deflection, so that the objective of rearward movement in upward deflection is attained even in the case of an upward movement of a single wheel.

The familiar tendency of a car to "nose-dive" when the brakes are applied is the result of a moment between the force of retardation exerted rearwardly at the ground, and the force of inertia exerted forwardly at the center of gravity, a distance above the ground. In Fig. 8 is shown a moment diagram illustrating how the present invention tends to counteract this tendency. The retarding force F, is shown applied to the system at the point O, this being a necessary corollary of the fact that all wheel forces must pass to the axle through the wheel axis, assuming that the brakes are not attached to the axle structure. This force is resisted by a counteracting force acting through the arms 25 and 26, through the point P. This results in a moment of Fd tending to raise the wheel center O with respect to the frame of the vehicle, thus tending to neutralize the tendency of the car frame to rise at the rear, which achieves another of the stated objects of the present invention.

When a car is cornering, the centrifugal force exerts a lateral force which is normally resisted by the friction of the tires on the road. When the wheels tend to leave the road momentarily under the influence of road irregularities this friction is momentarily destroyed, causing the car to slip outward on the turn. This effect is more disastrous when the rear wheels slip outward, since the car thereby assumes an attitude tending to cause it to turn more sharply than before, and further aggravates the difficulty of maintaining control. Another cause of such slippage in conventional axle systems is the lateral component of vertical deflection in the presence of roll deflection. Most suspension systems limit the vertical path of the wheels in parallel deflection to an axis which remains fixed relative to the vehicle. Consequently when the frame of the vehicle is inclined in roll deflection, as in cornering, the wheels tend to move somewhat laterally when parallel deflection is induced by road irregularities. This forces the tires to travel in a path deflected from their normal course, and thus tends to lower their adhesion to the road, which increases the probability of sidewise slipping. From the foregoing description and the Figs. 5, 6 and 7, a to d inclusive it has been shown that in the present invention parallel deflection is accomplished about the axis P—P' which remains parallel to the axle, while roll deflection is accomplished about the axis Q—Q' which is fixed to the vehicle. In thus accomplishing another of the stated objectives of this invention, it may be seen that the axis P—P' remains parallel to the road during roll deflection, and that vertical motion in parallel deflection will be without any lateral component tending to destroy the adhesion of the tires to the road.

Inasmuch as the axle 14 is limited to rotation about the two axes P—P' and Q—Q', and inasmuch as the greater portion of the mass of axle 14 is much closer to either one of these axes than are the wheels 10 and 11, it is evident that under any combination of deflections possible the displacement and relative velocity of movement of the axle will always be substantially less than those of the wheels. Since the kinetic energy of a moving mass is in proportion to the square of its velocity, and the effectively unsprung proportion of a partially sprung mass in proportion to its kinetic energy of motion, it will be seen that the effective unsprung mass of axle 14 will be only a fraction of its total mass, in attainment of one of the stated objectives of the invention. Another important advantage arising from the relatively small movement of the inboard parts of axle 14 is that the clearances necessary between the normal position of the axle and its extreme limits of travel are much smaller than in any system having an axle moving in translatory motion. This makes the design much more easily adaptable to application to a passenger carrying vehicle without unduly limiting either the possible movement of the wheels or the space available for passengers and luggage.

From the foregoing description it may be seen that the system achieves the stated objective of kinematical design. For example, translation along a longitudinal axis and rotation about a vertical axis are defined by the arms 25 and 26, while vertical and lateral translations are prevented by the bearing system at point S. The two remaining degrees of freedom are the previously referred to rotations about the deflection axis P—P' and the roll axis Q—Q' which are permitted in response to the resultant of the forces exerted by the road, the spring suspension, and the inertia of the system, in accordance with the desired function of a rear axle system.

The foregoing description and figures show a preferred design and arrangement of elements in embodiment of the present invention. Other arrangements may be used without departing from the scope of the invention, such as will be apparent to those skilled in the art. For example, the arms 25 and 26 may extend from the line P—P' rearward to points of attachment to the car frame, in which case understeer will be obtained in proportion to the distance the line R—R' is located above the point S. Similarly, the line P—P' and the point S may be located ahead of the wheel axis O—O' instead of behind it as shown, in which case the desired rearward component of upward deflection will be in proportion to the distance that the line P—P' is above the axis O—O'. The axis Q—Q' may be located outside the plane R—S—R', in which case the design of the bearing structure as shown in Fig. 3 will be modified to resist additional loads, the nature of which will be apparent to those skilled in the art.

The possible combinations of the relative positions of the axis P—S—P' and the line R—R' in relation to the wheel axis O—O' are shown in Figs. 9–12. In Fig. 9 is shown the arrangement previously described, as shown in Fig. 1, in which P—S—P' is behind and below the normal position of the wheel axis, O—O' while R—R' is forward of and below the point S. In this arrangement the center bearing point S is fixed to the axle midway between the wheels but displaced from the wheel axis in a plane passing through the wheel axis and intersecting the ground behind the wheel axis, and the connection points R—R' of the radius arms are located in a plane passing through the center fixed point S and intersecting the ground forward of the wheel axis. In Fig. 10, P—S—P' is shown behind and below O—O' while the arms 25 and 26 extend rearwardly, R—R' being behind and above the point S. In Figs. 11 and 12, the axis P—S—P' is forward of and above the wheel axis O—O' while the arms 25 and 26 extend forward and rearward of the axis P—S—P', respectively. A possible disadvantage of the forward position of the point S is the fact that lateral forces on the wheels due to centrifugal forces in cornering will introduce an oversteering deflection if any appreciable compliance is present in the system, so that satisfactory performance in such a case will be dependent on the rigidity of the structure of the axle 14 and the arms 25 and 26 taken with their connecting bearings, so that rubber bushings should not be used at the points P, P', R and R' in this design.

From the Figs 9–12 it may be seen that the essential features of the system as described are that a plane drawn through the axis O—O' and the axis P—S—P' will slope downward to the rear of the vehicle, intersecting the ground in a line to the rear of the wheel axis O—O', while a plane drawn through S, R and R' will slope downward toward the front of the vehicle, intersecting the ground forward of O—O' if roll understeer is to be obtained, or will be horizontal if roll understeer is not to be obtained.

While the forms of apparatus herein described constitute preferred embodiments of the invention, it is to be understood that the invention is not limited to this precise form of apparatus, and that changes may be made therein without departing from the scope of the invention which is defined in the appended claims.

What is claimed is:

1. In an axle system kinematically related to a vehicle frame, the combination of an axle carrying wheels on a common wheel axis, constraining means fixed to said axle constraining said axle to rotation about a deflection axis parallel to but below and to the rear of said wheel axis, bearing means fixed to said frame forming a roll axis contained in a plane perpendicular to said deflection axis at a point midway between said wheels, connecting means attached to said axle along said deflection axis and cooperating with said bearing means to restrain said axle from vertical or lateral translatory motion while permitting said axle and said deflection axis to rotate about said roll axis, and radius arms pivotally connecting said constraining means to fixed points on said frame.

2. In an axle system kinematically related to a vehicle frame, the combination of an axle carrying wheels on a common wheel axis, a center bearing fixed to said axle midway between said wheels but displaced from said wheel axis in a plane passing through said wheel axis intersecting the ground behind said wheel axis, a pair of bearings substantially equidistant from said center bearing defining a deflection axis parallel to said wheel axis and passing through said center bearing, means connecting said center bearing to a center fixed point on said frame to prevent lateral and vertical movement of said center bearing relative to said frame, radius arms connecting said pair of bearings to fixed points on said frame, said fixed points being contained in a plane passing through said center fixed point and intersecting the ground forward of said wheel axis.

3. In an axle system kinematically related to a vehicle frame, the combination of an axle carrying wheels on a common wheel axis, means defining a deflection axis fixed to said axle and parallel to the wheel axis and behind and below said wheel axis, bearing means fixed on the frame defining a roll axis normal to said deflection axis and substantially centrally of the frame, means on said axle connected to said bearing means for confining the movement of said deflection axis to a roll about said roll axis, and radius arms operable between fixed points on said frame and said deflection axis defining means for causing a wheel moving upwardly relative to the other wheel to likewise move forwardly relative thereto.

4. In an axle system kinematically related to a vehicle frame, the combination of an axle carrying wheels on a common wheel axis, means defining a deflection axis fixed to said axle and parallel to the wheel axis and offset therefrom both vertically and horizontally, bearing means fixed on the frame defining a roll axis normal to said deflection axis and substantially centrally of the frame, means of said axle connected to said bearing means for limiting the movement of said deflection axis essentially to a roll about said roll axis while allowing fore and aft translation thereof, and radius arms operable between fixed points on said frame and said deflection axis defining the fore and aft position of said deflection axis.

5. In an axle system kinematically related to a vehicle frame, the combination of an axle carrying wheels on a common wheel axis, means defining a deflection axis fixed relative to said axle parallel to said wheel axis but displaced therefrom, said means including a center bearing and a pair of side bearings attached to said axle coincident with said deflection axis, means attached to said frame engaging said center bearing to define the vertical and transverse position of said axle, and radius arms connecting said side bearings to fixed points on said frame to define the longitudinal position of said axle.

6. In an axle system kinematically related to a vehicle frame, the combination of an axle carrying wheels on a common wheel axis, means defining a deflection axis fixed relative to said axle parallel to said wheel axis but displaced therefrom, said means including a center bearing and a pair of side bearings attached to said axle coincident with said deflection axis, means pivotally attached to said frame along a substantially longitudinal roll axis and engaging said center bearing to define the vertical and tranverse position of said axle while allowing freedom of rotation about said deflection axis and said roll axis, and radius arms connecting said side bearings to fixed points on said frame to define the longitudinal position of said axle.

7. In an axle system kinematically related to a vehicle frame, the combination of an axle carrying wheels on a common wheel axis, means defining a deflection axis fixed relative to said axle parallel to said wheel axis but displaced therefrom, said means including a center bearing and a pair of side bearings attached to said axle coincident with said deflection axis, joint means pivotally attached to said frame along a substantially longitudinal roll axis and engaging said center bearing to define the vertical and transverse position of said axle while allowing freedom of rotation about said deflection axis and said roll axis, said joint means being constructed and arranged to allow translatory motion of said center bearing along said roll axis, and radius arms connecting said side bearings to fixed points on said frame to define the position of said axle in longitudinal translation and in rotation about a vertical axis.

8. In an axle system kinematically related to a vehicle frame, the combination of an axle carrying wheels on a common wheel axis, means attached to said axle defining a deflection axis fixed relative to said wheel axis and parallel to but displaced therefrom in a plane passing through the normal position of said wheel axis intersecting the ground to the rear thereof, bearing means fixed on the frame defining a roll axis substantially longitudinal and centrally of said frame, joint means pivotally attached to said axle coincident with said deflection axis and pivotally attached to said frame coincident with said roll axis, connecting means pivotally attached to said axle coincident with said deflection axis and pivotally attached to said frame in a plane passing through said bearing means and intersecting the ground forward of said wheel axis.

References Cited in the file of this patent

UNITED STATES PATENTS

| | | |
|---|---|---|
| 2,083,085 | Palmer | June 8, 1937 |
| 2,256,069 | Wagner | Sept. 16, 1941 |
| 2,418,744 | Ballamy et al. | Apr. 8, 1947 |
| 2,556,630 | Panhard | June 12, 1951 |